United States Patent [19]
Weinstein

[11] 3,795,067
[45] Mar. 5, 1974

[54] EDUCATIONAL APPARATUS

[76] Inventor: Harold Weinstein, 1820 Avenue V, Brooklyn, N.Y. 11229

[22] Filed: Oct. 16, 1972

[21] Appl. No.: 297,615

[52] U.S. Cl. ............................... 35/9 D, 35/35 D
[51] Int. Cl. .......................................... G09b 3/02
[58] Field of Search ........... 35/9 R, 9 D, 31 F, 35 D, 35/35 H, 48 R, 69, 70, 71

[56] References Cited
UNITED STATES PATENTS

| | | | |
|---|---|---|---|
| 2,652,635 | 9/1953 | Conger | 35/69 X |
| 3,154,863 | 11/1964 | La Prelle | 35/69 X |
| 3,659,356 | 5/1972 | Nelson | 35/35 D |
| 2,491,084 | 12/1949 | Bobo | 35/69 X |
| 3,283,417 | 11/1966 | Lohmar | 35/9 R |
| 3,016,243 | 1/1962 | Irwin | 35/71 X |

*Primary Examiner*—Harland S. Skogquist

[57] ABSTRACT

Educational apparatus including a block having a planar surface formed with a square array of holes therein. A card having indicia representing an educational problem is positioned on the planar surface and fixed thereto by a pair of pins inserted through a pair of holes in the card in registration with two of the holes in the square array on the planar surface of the block. Positioning of the pins fixes a code for choosing the correct answer to the problem displayed on the card. An answer to the problem is chosen by selecting an answer card having appropriate indicia thereon from the plurality of cards and superimposing the answer card on the problem card. The answer card selected, if correct, will have a pair of holes which register with the pins extending through the problem card to establish and immediately visually indicate to the student the correctness of the selection of his answer. If the holes on the answer card are not in registration with the pins, the student will have an indication of an incorrect answer and must select another answer card until registration is accomplished. The problem and answer cards are transparent so that their positioning on the planar surface of the block may be interchanged with the result that the answer card may become a problem card and the problem card the answer card, respectively.

3 Claims, 3 Drawing Figures

PATENTED MAR 5 1974 3,795,067

EDUCATIONAL APPARATUS

BACKGROUND OF THE INVENTION

1. Field of the Invention

This invention relates to an educational game or apparatus primarily intended as an aid for teaching children the alphabet by associating familiar objects with the initial letter of that object's name, although it will become apparent hereinafter that the apparatus of the invention is not limited thereto.

2. Description of the Prior Art

It has heretofore been proposed to teach children how to associate letters or words with familiar objects by the use of educational games. Types of such games are illustrated in U.S. Pat. Nos. 2,839,843, 2,505,230, and 2,656,617, as well as my own prior U.S. Pat. No. 3,609,877.

Coded blocks in the form of letters and numerals are provided. The code is applied to a different or numeral as a distinctive array of pegs extending from one surface of the block.

A card containing a pictorial representation of a familiar object is usually provided for use with the coded letters and numerals. Each card contains groups of holes, each group of holes being in a distinctive array corresponding to an array of pegs on a particular letter or numeral block.

The object is for the child to attempt to complete a problem by, for example, spelling the word which identifies or is the familiar name of the object pictorially represented on the card by putting the correct blocks in precise order on the card to spell the name of the familiar object which has been pictorially represented. If the child correctly spells the name of the object, each block will fit in the card. If any particular letter which has been selected is incorrect, the code pegs extending from the surface of the block will not match the array of holes provided on the card as the child attempts to push the block into the card, thereby indicating that an incorrect letter has been selected.

The present invention extends this concept further by enabling the student not only to visually associate pictorial representations of familiar objects with a letter of the alphabet by the use of a peg coding system enabling the student to self-correct errors, but one in which pegs are manually disposed in coded relation by the student himself, which helps the young student to develop coordination and also making the educational apparatus of the present invention more interesting and fun to use, as well as accomplishing its primary educational function.

SUMMARY OF THE INVENTION

In carrying out the objects of the present invention a block is provided having a square array of holes formed in one planar surface thereof which is adapted to receive in overlying relation a problem card and one of a plurality of answer cards each of which carry indicia representing an educational problem and a purported answer to the problem, respectively. Only one of the answer cards contains the correct answer.

The problem card is approximately twice the width of the answer card and is positioned on the planar receiving surface of the block. Code marks, such as a pair of holes, are formed on the right half of the problem card so that they will register with a pair of holes in the square array of holes on the underneath block. A pair of pins are inserted through the holes in the problem card into the block and establish a code for the correct answer to the problem posed as well as fixing the problem card in position on the block. The indicia posing the problem on the problem card is arranged to appear on the left half of the problem card.

The studuent then selects an answer card containing indicia which he feels is an answer to the problem posed by the indicia on the problem card. The answer card also has two holes arranged about its periphery, which if the answer card selected is correct, will register with the pins inserted through the problem card into the block. If an incorrect answer card is selected, the holes will be out of register with the pins and cannot be placed in overlying relationship with the problem card so that the indicia on the answer card is in juxtaposition with the indicia on the left half of the problem card.

The answer and problem cards are also formed from transparent material thus making it possible for the positioning of the cards on the block to be reversed. In this manner, the answer card can be used as the problem card, and vice-versa.

BRIEF DESCRIPTION OF THE DRAWINGS

Further objects and advantages of the invention will become apparent from the following specifications and claims and from the accompanying drawings wherein:

DESCRIPTION OF THE PREFERRED EMBODIMENT

Figure 1:
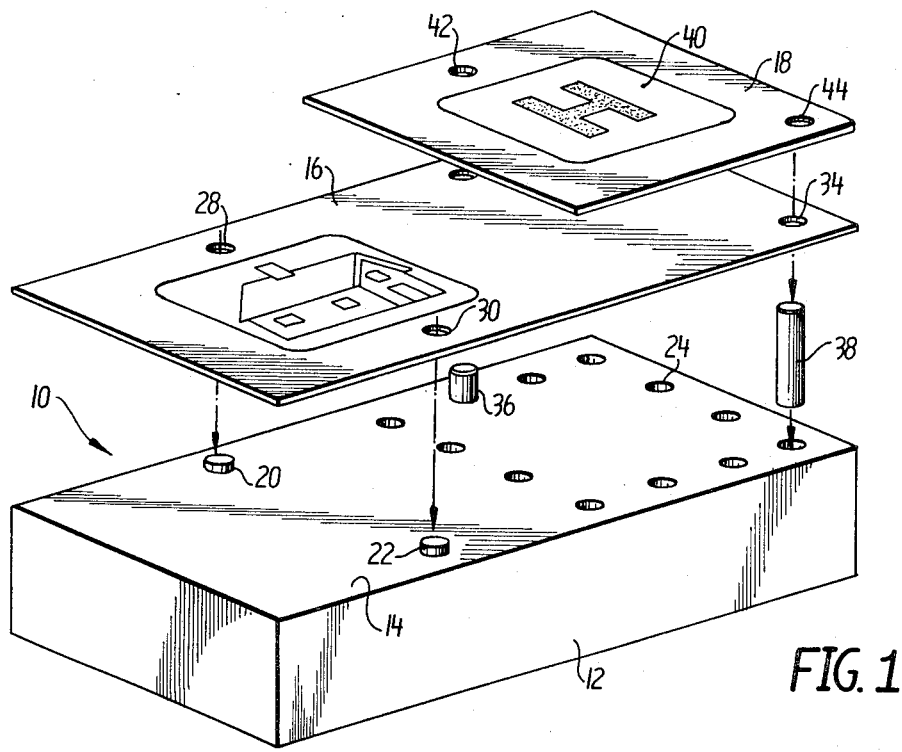
FIG. 1 is an exploded perspective view of the elements of the present invention.

Referring now to the drawing in detail wherein like numerals indicate like elements throughout the several views, FIG. 1 illustrates the educational apparatus of the present invention indicated generally by the numeral 10. Apparatus 10 includes a rectangular block 12 of wood, plastic or metal, as desired. Block 12 is provided with a planar surface 14 for receiving a flat problem card 16 and a planar answer card 18 in overlying relationship.

Planar surface 14 of block 12 includes a pair of upstanding pegs 20 and 22 adjacent its opposite edges. A square array of holes 24 are also formed in the right-hand portion of planar surface 14 of block 12.

Problem card 16 is approximately of the same size as the planar surface 14 of block 12 and includes a pictorial representation 26 of an object which is to be identified by the student using the apparatus. Pictorial representation 26 is positioned on the lefthand half of problem card 16.

Immediately above and below pictorial representation 26 are holes 28 and 30 which are adapted to receive pegs 20 and 22, respectively, extending upwardly from the planar surface 14 of block 12 so that the problem card 16 can be seated in proper alignment on surface 14 of block 12 with a pair of holes 32 and 34, forming a code or mark for the correct answer to the problem, in overlying registration with two of the holes in the square array of holes 24 formed in planar surface 14 of block 12.

When card 16 is disposed on planar surface 14 of block 12 with pegs 20 and 22 extending through holes 28 and 30 respectively, a pair of elongated pins 36 and 38 can be placed by the student through the holes 32, 34 on the problem card in registration with the holes 24 in the planar surface 14 of block 12 so as to further fix problem card 16 in position and to set up a visual indication of a correct code for receiving the correct answer card on the problem card 16.

Answer card 18 contains a letter of the alphabet corresponding to the first letter of the name of the object pictorially represented on 26 on the problem card 16. This is provided by imprinting indicia 40 on the answer card. As will be apparent from FIG. 1, answer card 18 is approximately one-half the width of problem card 16 and is adapted to be placed in overlying relationship on the right half of problem card 16 so that its indica 40 is in juxtaposition to the pictorial representation 26.

Answer card 18 is also provided with a pair of holes 42 and 44. If the indicia 40 represents a correct answer to the problem posed by the pictorial representation 26 on problem card 16, holes 42 and 44 will register with holes 32 and 34, respectively, on the problem card 16 and will enable insertion of answer card 18 over pins 36 and 38. If answer card 18 chosen from the multitude of answer cards provided is incorrect, holes 42 and 44 will not register with pins 36 and 38, thereby immediately visually informing the student that the answer card 18 selected was incorrect and the association made between the pictorial representation 26 and indicum 40 should be attempted again by the use of a different answer card 18.

Figure 2:
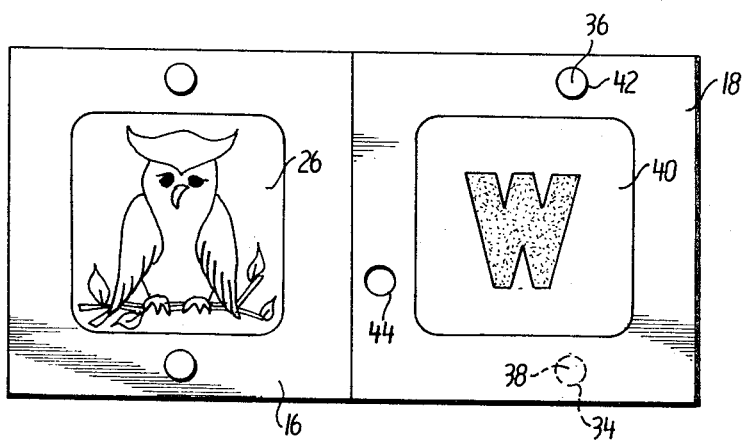
FIG. 2 is a top plan view of the apparatus of the present invention indicating an incorrect selection of an answer to the problem posed by the apparatus.

FIG. 2 illustrates such an incorrect association. Problem card 16 in FIG. 2 carries a pictorial representation 26 of an owl, thereby indicating that the student is to select an answer card 18 whose indicum 40 should be letter "O." The student, however, has selected an answer card 18 with the indicum 40 presenting the letter "W." Accordingly, holes 42 and 44 on answer card 18 will not align or be in registration with holes 32 and 34 on the problem card 16 although hole 42 and hole 32 may be in registration. It is absolutely essential that both holes are in registration for pins 36 and 38 to allow insertion of answer card 18 into overlying relation with problem card 16 so that indicum 40 is in juxtaposition with the pictorial representation 26.

Figure 3:
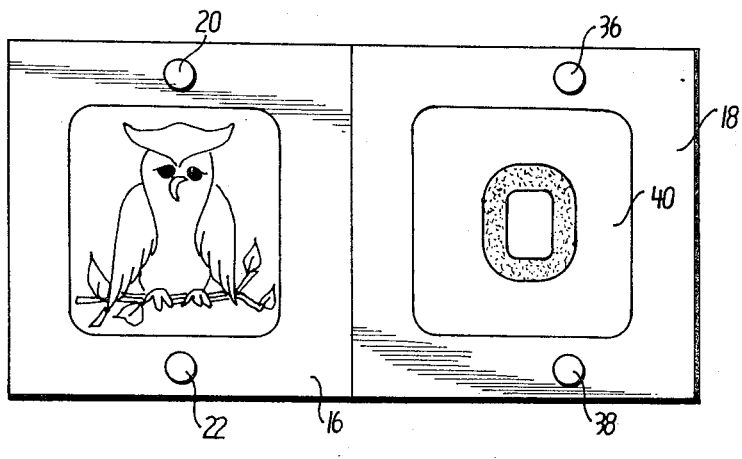
FIG. 3 is a top plan view similar to FIG. 2, except indicating the selection of the correct answer card.

FIG. 3 illustrates the correct association of an answer card 18 bearing the indicum 40 of "O," with problem card 16. As shown in FIG. 3, when answer card 18 selected is correct, both pins 36 and 38 will extend through the holes 42 and 44 on the answer card 18.

Although it is not necessary, it is preferable that both the answer card 18 and problem card 16 are formed from transparent material. As pointed out previously, the problem card 16 has approximately twice the width of the answer card 18 and the pictorial representation 26 on the problem card 16 is on the lefthand half of the card. The answer card is adapted to overlie the problem card on the block on the righthand half thereof so that the indicia thereon are presented in tandem reading relation. The problem and answer cards are formed from transparent material so that the problem and answer cards may be interchanged in their respective positioning on the block 12. In this case, the answer card 18 is positioned first on the block 12 and will be visible through the righthand half of the problem card 16 which has no indicia thereon, enabling the problem and answer cards to become answer and problem cards respectively. In other words, in the example given, by positioning answer card 18 first on the planar surface 14 of the block 12 and then inserting pins 36 and 38 through holes 42 and 44, respectively, the correct code will be established and the student will be asked to associate the letter indicum 40 with a plurality of pictorial representations 26 which corresponds to the indicum 40 on the answer card 18.

While the invention has been illustrated as an effective tool to teach a child the alphabet, it should be understood that it can be used to teach the child any association of words and pictures and to aid in the spelling of words represented by familiar objects or even arithmetic problems which may be posed on problem card 16, the answer being provided on answer card 18. Problems of spelling or arithmetic may be posed as indicum 26 and the correct solution given by indicum 40.

What is claimed is:
1. Educational apparatus comprising:
   block means having a surface for receiving at least two cards in overlying relationship;
   one of said cards having indicia thereon representing an educational problem, the other of said cards having indicia thereon representing the answer to said educational problem, the indicia on said cards when said cards are placed on said block means providing a visual representation to the student of the educational problem represented thereon and the purported correct answer thereto, and
   code means on each of said cards and block means for enabling the student to check the correctness of the answer selected to the educational problem posed by the indicia on said one card, said code means including
   an array of holes formed in the receiving surface of said block means,
   at least two holes forming code marks on said card posing said educational problem corresponding to and in registration with two holes in said array of holes formed in the receiving surface of said block means,
   removable pin means for insertion through said holes in registration in said problem card and said block means, and
   the other of said cards containing said indicia purporting to be an answer to the educational problem posed by the indicia on said problem card containing code marks in the form of at least two holes which if the indicia on said answer card represents the correct answer to the indicia posing the problem on said problem card will register with said pin means inserted through the holes in said problem card and block means, and if incorrect, will not.

2. Educational apparatus in accordance with claim 1 wherein:
   said problem card has approximately twice the width of said answer card and the indicia on said problem card is on one half thereof, the answer card being adapted to overlie said problem card on said block means on the half thereof having no indicia thereon so as to present the problem and answer thereto in tandem reading relation, and said problem and answer cards are formed from transparent material, whereby said problem and answer cards may be interchanged in their respective positioning on said block means so that said problem and answer cards may become answer and problem cards respectively because the answer card if positioned first on said block means will be visible through the half of the problem card having no indicia thereon.

3. Educational apparatus in accordance with claim 2 wherein:
said array of holes formed in said receiving surface on said block means is in a square array and
the code holes on said cards correspond to at least two positions of the holes in said square array on said block means.

* * * * *